(12) United States Patent  (10) Patent No.: US 6,901,678 B2
Kubota  (45) Date of Patent: Jun. 7, 2005

(54) MEASURING HEAD

(75) Inventor: Kazuhiro Kubota, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 10/855,965

(22) Filed: May 28, 2004

(65) Prior Publication Data

US 2005/0011078 A1 Jan. 20, 2005

(30) Foreign Application Priority Data

May 30, 2003 (JP) ........................................ 2003-154103

(51) Int. Cl.$^7$ .............................................. G01B 5/20
(52) U.S. Cl. ......................................... 33/551; 33/559
(58) Field of Search .......................... 33/533, 546, 551, 33/553, 554, 559, 561

(56) References Cited

U.S. PATENT DOCUMENTS

| | | | | |
|---|---|---|---|---|
| 4,187,614 A | * | 2/1980 | Abiru et al. ................... | 33/559 |
| 4,561,190 A | * | 12/1985 | Yamamoto et al. ........... | 33/561 |
| 4,888,877 A | * | 12/1989 | Enderle et al. ................ | 33/559 |
| 5,005,297 A | * | 4/1991 | Aehnelt et al. ................ | 33/559 |
| 5,189,806 A | * | 3/1993 | McMurtry et al. ............ | 33/553 |
| 6,209,217 B1 | * | 4/2001 | Tsuruta et al. ................. | 33/554 |
| 6,295,866 B1 | * | 10/2001 | Yamamoto et al. ........... | 33/551 |
| 2003/0070312 A1 | * | 4/2003 | Regitz ......................... | 33/553 |
| 2003/0159302 A1 | * | 8/2003 | Dall'Aglio et al. ........... | 33/551 |
| 2004/0168332 A1 | * | 9/2004 | Hama et al. ................... | 33/551 |

FOREIGN PATENT DOCUMENTS

JP          5-75606          10/1993

* cited by examiner

*Primary Examiner*—G. Bradley Bennett
(74) *Attorney, Agent, or Firm*—Nixon Peabody LLP; David S. Safran

(57) ABSTRACT

A measuring head is provided with a retracting device for a sensing pin, comprising an electric motor-driven feed screw, a nut shifted by the feed screw and an inclined face formed on the nut; a seesaw member to which the sensing pin is fitted is swung by the linear motion of the inclined face to retract the sensing pin; not only can the retracting speed and the returning speed of the sensing pin be controlled as desired but also can the retracting action of the sensing pin be stopped on the way to make possible its fine positioning. Further, the electric motor may be provided with a manual knob, and the sensing pin would be thereby enabled to be manually retracted.

4 Claims, 4 Drawing Sheets

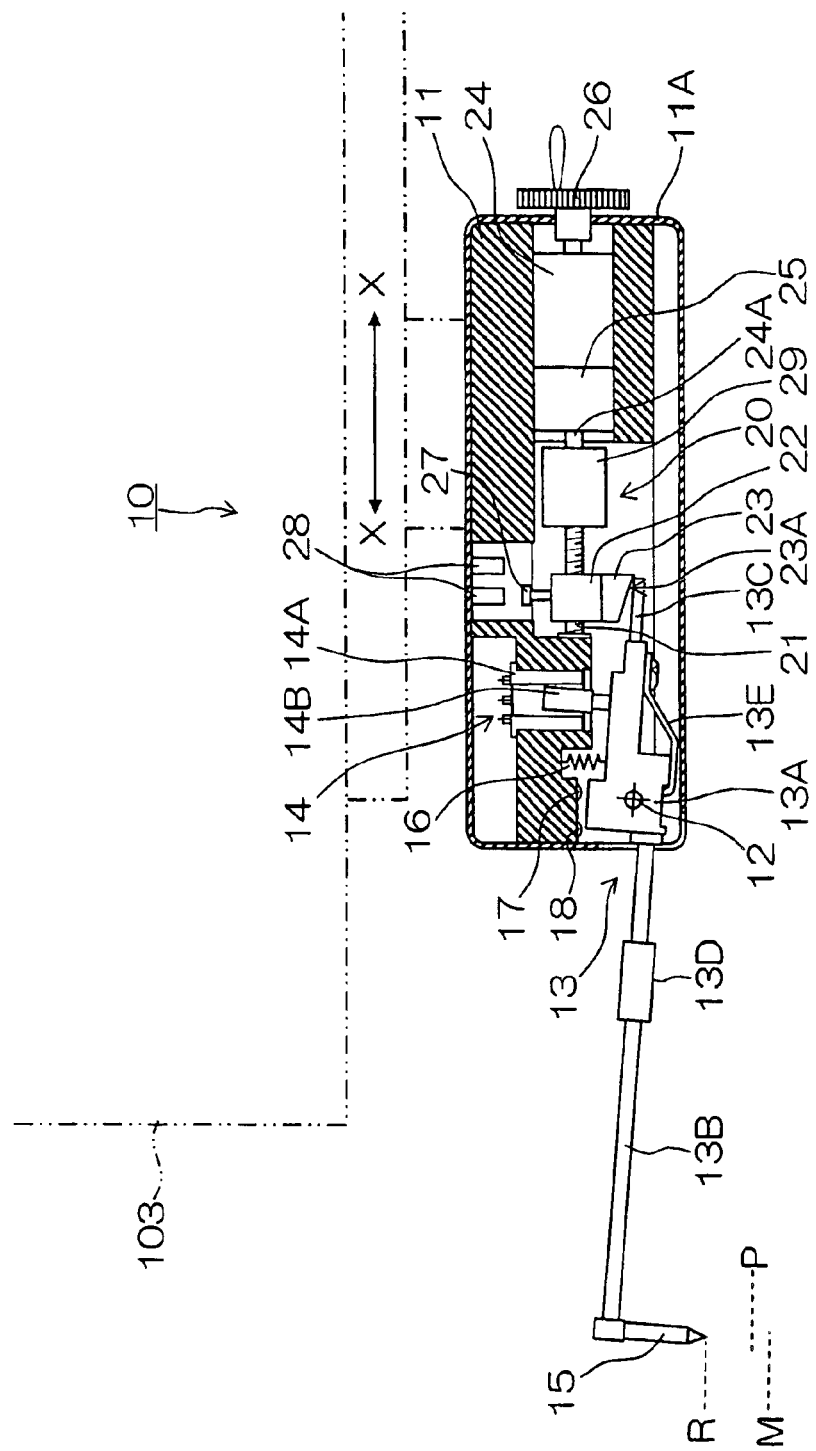

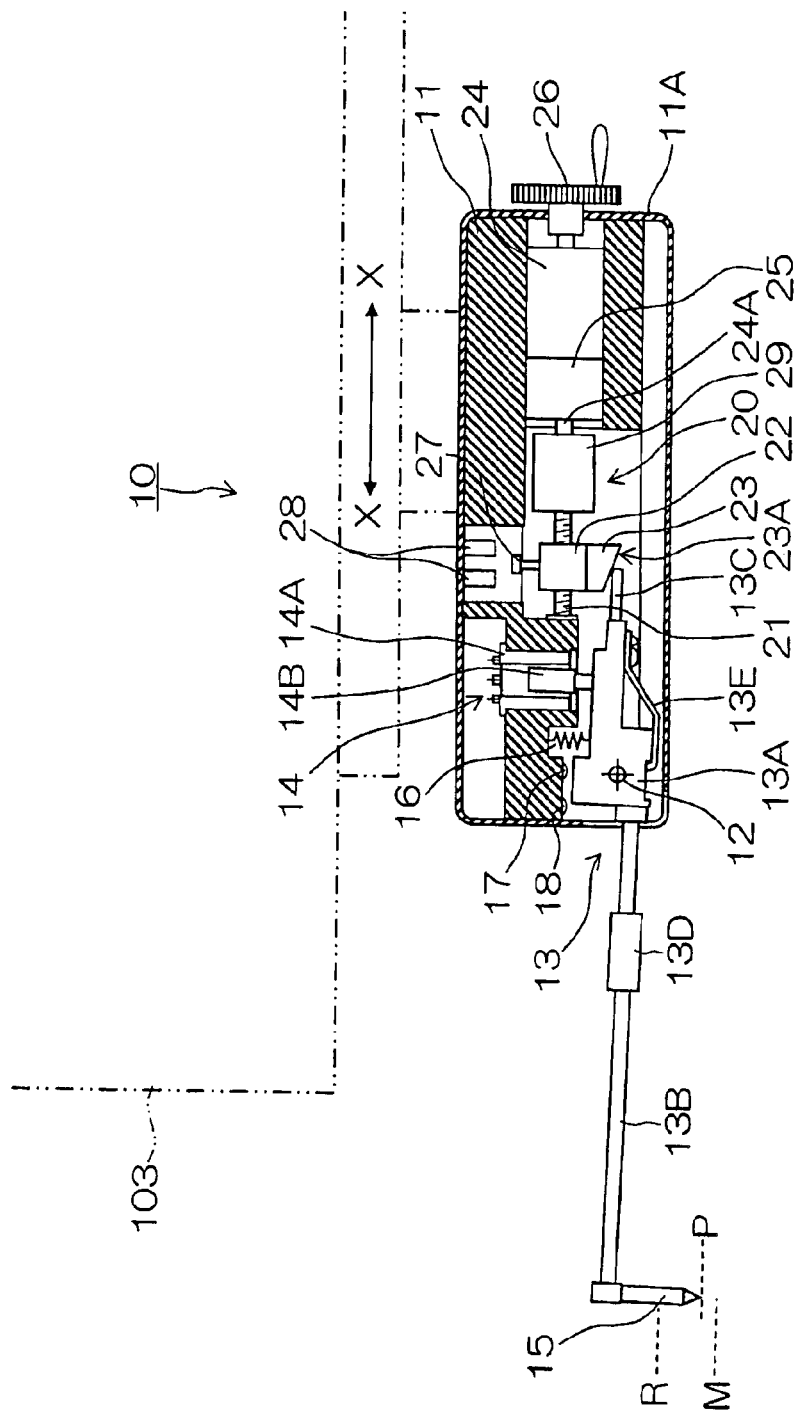

MEASURING HEAD

BACKGROUND OF THE INVENTION

1. Field of the Invention

The present invention relates to a measuring head, and more particularly to a measuring head which is to be used in surface texture measuring instruments, contour shape measuring machines and the like and has a retractable device for shifting the sensing pin from its measuring position to a predetermined retracting position.

2. Description of the Related Art

A conventional surface texture measuring instrument, contour shape measuring instrument or the like for measuring the surface roughness or contour shape of a work has a sensing pin at the tip and a measuring head provided with a seesaw member supported to be swingable pivoting on a fulcrum member, a urging member for urging the seesaw member in one direction, and a detector arranged on the other side than the sensing pin with respect to the fulcrum member and detecting the displacement of the sensing pin by detecting the displacement of the seesaw member. By causing this measuring head to traverse along the measured face of the work and the sensing pin to trace the measured face, the surface roughness or contour shape of the work is measured.

In a measuring head having such a structure, in order to protect the sensing pin when a work is set or any discontinuous face of the work is measured, there is provided a retracting device for moving the sensing pin.

Such a conventional retracting device has a mechanism in which a solenoid is disposed near the seesaw member, and the sensing pin is moved from its measuring position to a prescribed retracting position and vice versa by turning on and off power supply to the solenoid and thereby swinging the seesaw member.

Another retracting device has a mechanism in which a cam is turned by an electric motor, the seesaw member is swung by the lift of the cam, and the sensing pin is thereby caused to retract (e.g. see the Japanese Utility Model Application Publication No. 5-75606).

SUMMARY OF THE INVENTION

However, the conventional retracting device using a solenoid swings the seesaw member by a certain angle by turning on or off the solenoid, and therefore involves a problem that no fine positioning is possible and stopping it on the way is not possible either. Nor does it permit manual retraction.

Or the retracting device using an electric motor and a cam described in the Japanese Utility Model Application Publication No. 5-75606, though it can be equipped with a knob for manual operation use, can be stopped on the way only when it is electrically driven, and manual operation, for which the electric motor is released from excitation, cannot always stop the shift on the way. Accordingly it is unsuitable for fine positioning.

An object of the present invention, attempted in view of these circumstances, is to provide a measuring head for use in surface texture measuring instruments, contour shape measuring instruments and the like, having a retracting mechanism capable of controlling the retracting speed and the returning speed of the sensing pin as desired, stopping the sensing pin on the way of its escaping action, permitting fine positioning and enabling the sensing pin to be retracted by manual operation as well.

In order to achieve the object stated above, a measuring head according to a first aspect of the invention comprises:

a sensing pin disposed at the measuring head's tip, a seesaw member which is supported to be swingable pivoting on a fulcrum member, an urging member which urges the seesaw member in one direction, a detector which is disposed on the other side than said sensing pin with respect to said fulcrum member and detects any displacement of said sensing pin by detecting the displacement of said seesaw member, and a retracting device which moves said sensing pin from its measuring position to a predetermined retracting position, wherein said retracting device comprises:

an electric motor, a feed screw which is driven rotationally by the electric motor, a nut which screws onto the feed screw, is obstructed by a stop from turning, and is linearly moved along the feed screw by the turning of said feed screw, and an inclined member which is formed on the nut or coupled to the nut and has an inclined face which is in contact with said seesaw member on the other side than said sensing pin with respect to said fulcrum member, wherein said sensing pin being moved from its measuring position to the predetermined retracting position by linearly moving said inclined face to swing said seesaw member.

According to this first aspect of the invention, as the retracting device of the sensing pin of the measuring head swings the seesaw member by linearly moving with the feed screw driven by the electric motor the inclined face in contact with the seesaw member to which the sensing pin is fitted, the retracting speed and the returning speed of the sensing pin can be set as desired, and the retracting action of the sensing pin can be stopped on the way to make possible its fine positioning.

In a measuring head according to a second aspect of the invention, one side of the shaft of the electric motor in the configuration according to the first aspect of the invention is linked to the feed screw and the other side is fitted with a manual knob.

According to this second aspect, not only can the sensing pin be manually retracted but also can its action be stopped on the way, making possible fine positioning of the sensing pin.

In a measuring head according to a third aspect of the invention, the configuration according to the first of second aspect of the invention is further provided with sensors which detect the stroke ends of the nut linearly moving along the feed screw.

According to this third aspect, as the stroke ends of the nut having the inclined face are detected by the sensors, the seesaw member to which the sensing pin is fitted can be prevented from swinging beyond its properly operable range, and accordingly the sensing pin is protected from damage.

As described above, in the measuring head according to the invention, since the retracting device for the sensing pin has an electric motor-driven feed screw and an inclined face moved by the feed screw and the linear motion of the inclined face swings the seesaw member to which the sensing pin is fitted to retract the sensing pin, not only can the retracting speed and the returning speed of the sensing pin be controlled as desired but also can the retracting action of the sensing pin be stopped on the way to make possible its fine positioning.

Further, as the electric motor is provided with the manual knob, not only can the sensing pin be manually retracted but also can its action be stopped on the way, making possible fine positioning of the sensing pin by manual action.

BRIEF DESCRIPTION OF THE DRAWINGS

FIG. 3 shows a side sectional view of a state in which the sensing pin of the measuring head, which is the preferred embodiment of the invention, is in its retracting position; and FIG. 4 shows a side sectional view of a state in which the sensing pin of the measuring head, which is the preferred embodiment of the invention, is stopped on the way.

DETAILED DESCRIPTION OF THE PREFERRED EMBODIMENTS

Figure 1:
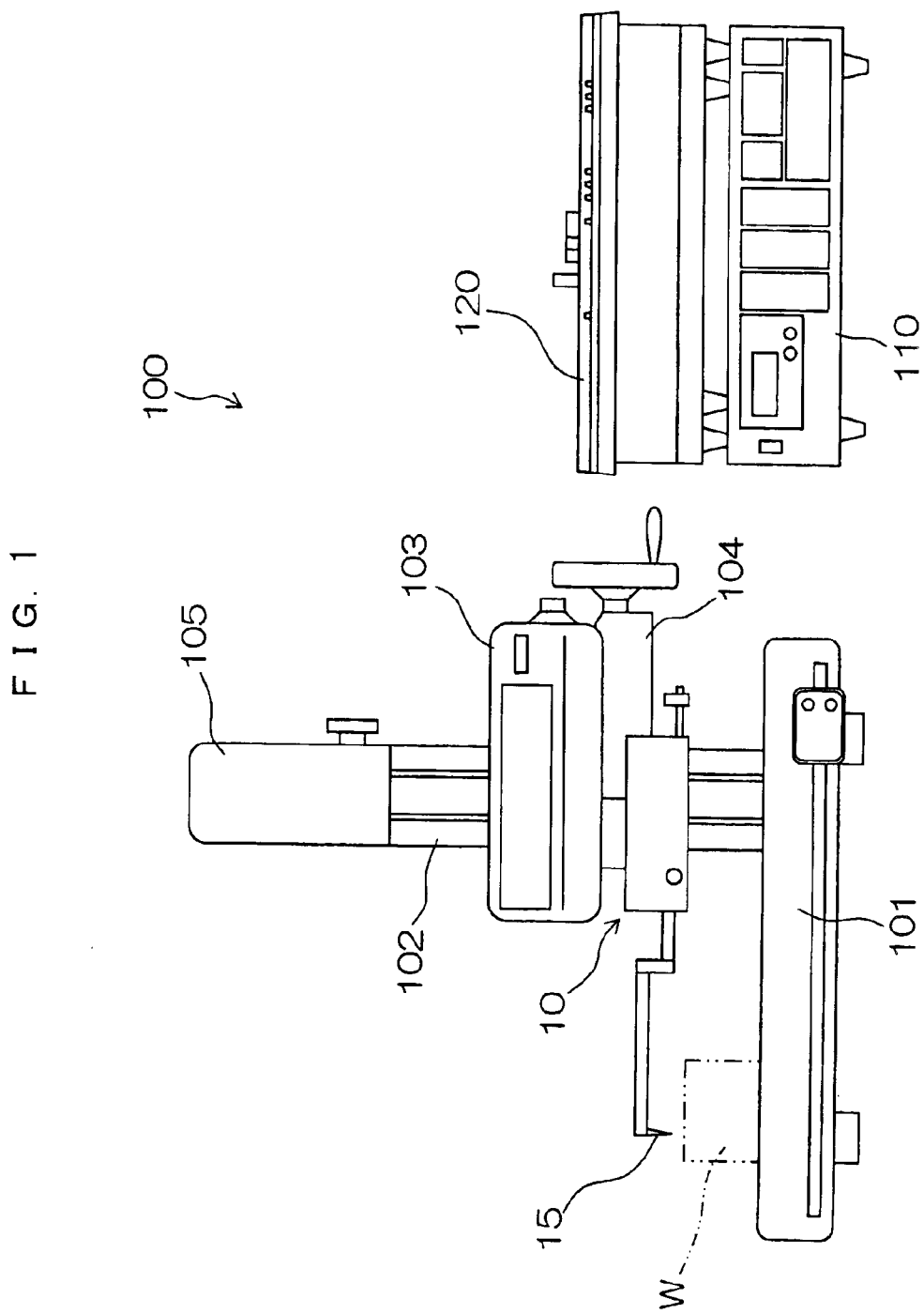
FIG. 1 shows a front view of a contour shape measuring instrument provided with a measuring head according to the present invention.

A measuring head, which is a preferred embodiment of the present invention, will be described in detail below with reference to the accompanying drawings, wherein like members will be designated by respectively like reference numerals or like reference characters.

FIG. 1 shows a front view of a contour shape measuring instrument using a measuring head according to the invention. A contour shape measuring instrument 100 is configured of a measuring section comprising a stool 101, a column 102 erected on the stool 101, a measuring head 10 having a sensing pin 15, a drive unit 103 for driving the measuring head 10 in its measuring direction, a manual inclining unit 104 for inclining the measuring head 10 and the drive unit 103, and an electric vertically shifting unit 105 for vertically shifting the measuring head 10, the drive unit 103 and the manual inclining unit 104, a control unit 110 for controlling measuring actions and analyzing measured data, and an XY recorder 120 for recording the measured results.

A work W, which is the object of measurement, is mounted on the stool 101. In the measuring action, the whole measuring head 10 is linearly driven in the horizontal direction in a state in which the sensing pin is in contact with the work W, and the displaced quantity of the sensing pin is detected by a detector in the measuring head 10.

Where the inclined face of the work W is to be measured, the measuring head 10 and the drive unit 103 are inclined by the manual inclining unit 104. Detected data are delivered to the control unit 110, where the data are analyzed and measurements are recorded.

Figure 2:
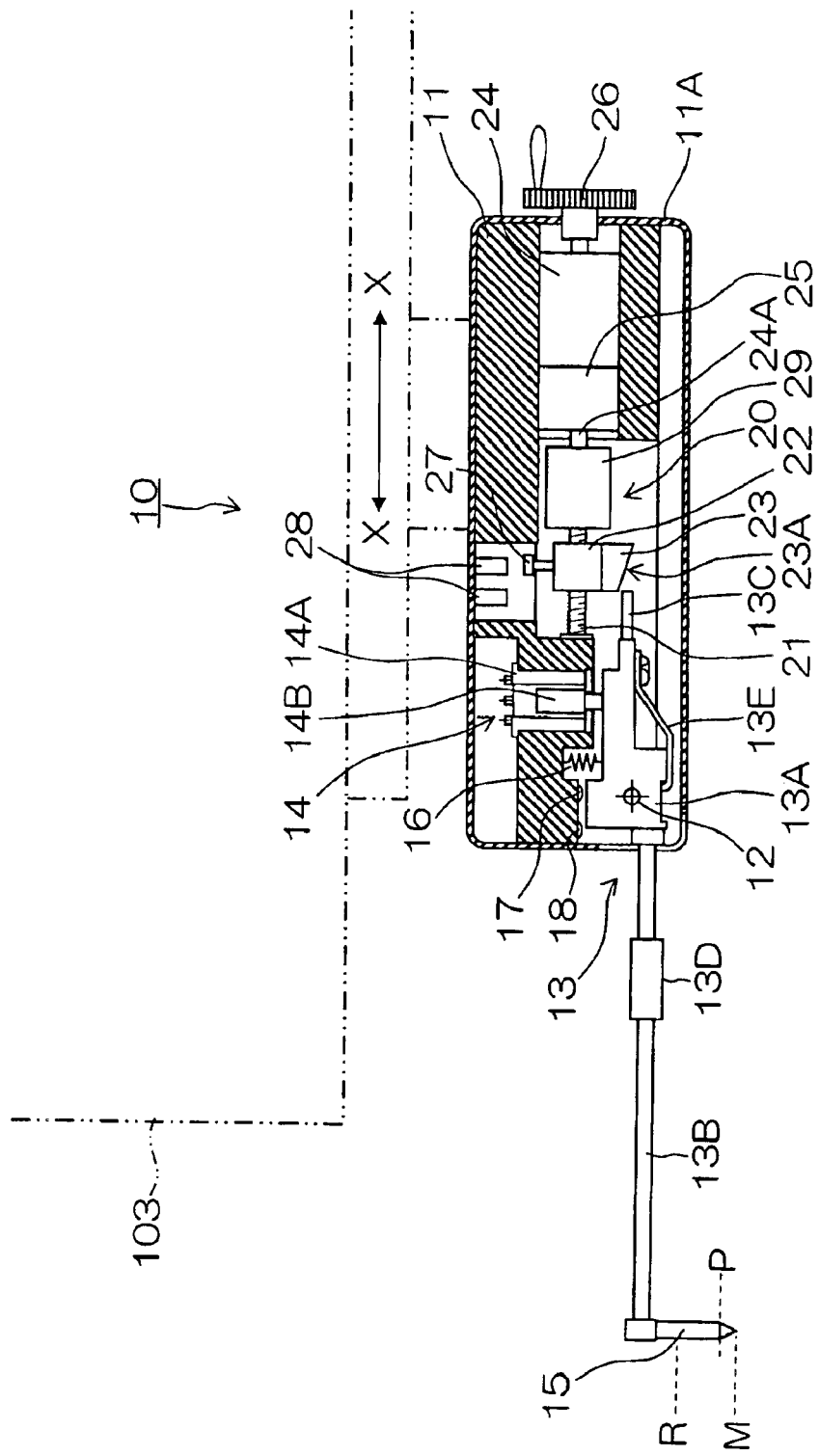
FIG. 2 shows a side sectional view of a state in which the sensing pin of a measuring head, which is a preferred embodiment of the invention, is in its measuring position.

FIG. 2 shows a side sectional view of the configuration of the measuring head 10. The measuring head 10, as shown in FIG. 2, comprises a body 11, a fulcrum member 12, a seesaw member 13, a differential transformer 14 which is the detector, the sensing pin 15, a tension spring 16 as the urging member, and a retracting device 20 among other elements.

The seesaw member 13 comprises a seesaw block 13A, an arm 13B, a pin 13C, a weight 13D and a leaf spring 13E. To the tip of the arm 13B is fitted the sensing pin 15, while the base end of the arm 13B is inserted into a fitting hole (not shown) bored in the seesaw block 13A and pressed in the inserting direction by the leaf spring 13E.

The weight 13D is fitted to the arm 13B, and its fitting position is adjustable. In the position of the seesaw block 13A reverse to the fitting position of the arm 13B is fitted the pin 13C.

The fulcrum member 12 comprises a fulcrum shaft fixed to the seesaw block 13A and a bearing (not shown) fitted to the body 11, and swingably supports the seesaw member 13.

The tip of the seesaw member 13 is urged downward by the tension spring 16 stretching between the body 11 and the seesaw block 13A as the urging member so that a measuring pressure be given to the sensing pin 15. This measuring pressure is adjusted by shifting the position of the weight 13D provided on the arm 13B. Thus, when the weight 13D is shifted toward the tip of the arm 13B, the measuring pressure rises, and when it is shifted toward the base end, the pressure lowers.

As the detector for detecting any displacement of the sensing pin 15, the differential transformer 14 is used. A coil 14A of the differential transformer 14 is provided in the body 11, while a core 14B of the differential transformer 14 is fitted to the seesaw block 13A. As its fitting position is on the other side than the sensing pin 15 with the fulcrum member 12 between them, the motion of the sensing pin 15 is converted into the motion of the core 14B, and is detected as an electrical signal of the differential transformer 14.

Above the seesaw block 13A of the body 11 are disposed a lower stopper 17 and an upper stopper 18 so as to regulate the stroke ends of the seesaw action of the seesaw member 13.

In order to protect the sensing pin when a work is set or when any discontinuous face of the work is measured, the retracting device 20 which shifts the sensing pin from its measuring position to a predetermined retracting position and vice versa is built into the measuring head 10.

The retracting device 20 comprises a feed screw 21, a nut 22 to screw onto the feed screw 21, an inclined member 23 formed on the nut 22 and an electric motor 24 to drive the feed screw 21.

One end of the feed screw 21 is supported by the body 11 via a bearing (not shown) while its other end is connected to the shaft 24A of the electric motor 24 into which a decelerator 25 is incorporated via a coupling 29. To the other side of the electric motor 24 than the shaft 24A is fitted a manual knob 26.

A stop 27 is fitted to the nut 22 and, as the stop 27 is loosely fitted into a long hole bored in the body, driving the feed screw 21 rotationally causes the nut 22 to shift linearly along the feed screw 21. As sensors for detecting the two stroke end positions of the nut 22, two proximity switches 28 and 28 are disposed in the body 11. Being actuated by an approach of the stop 27, they detect one or the other of the stroke ends.

While the measuring head 10 is shielded by a cover 11A, the sensing pin 15, the arm 13B, the weight 13D and the manual knob 26 are exposed outside the cover 11A.

Next will be described the actions of the measuring head 10 configured as described above. The sensing pin 15 comes into contact with the face to be measured of the work W in a measuring position M shown in FIG. 2. The whole measuring head 10 is driven by the drive unit 103 in the measuring direction (the X—X direction in the drawing), and the face to be measured of the work W is traced by the tip of the sensing pin 15. The quantity of the displacement of the sensing pin 15 in the vertical direction is converted by the seesaw member 13 into the shift quantity of the core 14B of the differential transformer 14, and this quantity is supplied as an electrical signal. The measuring pressure in this process is set to an appropriate level by adjusting the tension spring 16 and the weight 13D.

When the sensing pin 15 is to be retracted from the measuring position M to the retracting position R, the feed screw 21 is turned with either the electric motor 24 or the manual knob 26 to shift the nut 22 leftward in the drawing. When the nut 22 is shifted leftward in the drawing, the inclined face 23A of the inclined member 23 formed on the nut 22 comes into contact with the pin 13C of the seesaw member 13. As the nut 22 is further shifted, the pin 13C is shoved by the inclined face 23A to swing the seesaw member 13, and the shifting of the nut 22 is discontinued at the point of time when the proximity switch 28 on the left side of the drawing has detected the stop 27.

This causes the tip of the sensing pin 15 to retract to the retracting position R shown in FIG. 3. When the feed screw 21 is turned in the reverse direction and the nut 22 is returned rightward in the drawing, the tip of the sensing pin 15 is returned to the measuring position M shown in FIG. 2.

As the retracting device 20 of the sensing pin 15 functions by shifting in this way the inclined face 23A with the feed screw 21 driven by the electric motor 24, the retracting speed and the returning speed of the sensing pin 15 can be set as desired by controlling the revolving speed of the electric motor 24. It is possible to set the retracting speed high and the returning speed low or to set either speed high in the initial phase of the pertinent action and low in its final phase.

It is also possible to stop the sensing pin 15 in any desired position on the way between the measuring position M and the retracting position R. FIG. 4 shows a state in which the tip of the sensing pin 15 is stopped in an intermediate position P between the measuring position M and the retracting position R.

As the tip of the sensing pin 15 can be finely positioned as desired, it has been made possible to measure inner faces of thin holes, which was impossible by the prior art.

Also, as the retracting device 20 has the manual knob 26, it is possible to manually retract the tip of the sensing pin to any desired position or to finely position it, enabling even complex shapes to be measured easily.

To add, although the inclined member 23 has only one inclined face 23A in the embodiment of the invention described above, there may as well be disposed two inclined faces 23A and 23A with the pin 13C of the seesaw member 13 between them. In this case, the sensing pin 15 can be retracted upward with the upper inclined face 23A and downward with the lower inclined face 23A. Downward retraction is used when the sensing pin 15 is fitted upward to measure the upper face of a hole.

While it was stated that the retracting speed and the returning speed of the sensing pin 15 are set by controlling the revolving speed of the electric motor 24, the speeds can as well be set by altering the lead of the feed screw 21 or the inclination angle of the inclined face 23A or by the combination of the alteration of the lead of the feed screw 21 or the inclination angle of the inclined face 23A and the control of the revolving speed of the electric motor 24.

What is claimed is:

1. A measuring head, comprising:

a sensing pin disposed at the measuring head's tip, a seesaw member which is supported to be swingable pivoting on a fulcrum member, an urging member which urges the seesaw member in one direction, a detector which is disposed on the other side than said sensing pin with respect to said fulcrum member and detects any displacement of said sensing pin by detecting the displacement of said seesaw member, and a retracting device which moves said sensing pin from its measuring position to a predetermined retracting position, wherein said retracting device comprises:

an electric motor, a feed screw which is driven rotationally by the electric motor, a nut which screws onto the feed screw, is obstructed by a stop from turning, and is linearly moved along the feed screw by the turning of said feed screw, and an inclined member which is formed on the nut or coupled to the nut and has an inclined face which is in contact with said seesaw member on the other side than said sensing pin with respect to said fulcrum member, wherein said sensing pin being moved from its measuring position to the predetermined retracting position by linearly moving said inclined face to swing said seesaw member.

2. The measuring head according to claim 1, wherein one side of the shaft of said electric motor is linked to said feed screw and the other side is fitted with a manual knob.

3. The measuring head according to claim 1, further comprising sensors which detect the stroke ends of the nut linearly moving along said feed screw.

4. The measuring head according to claim 2, further comprising sensors which detect the stroke ends of the nut linearly moving along said feed screw.

* * * * *